July 25, 1967 G. E. MUNN 3,332,895
CELLULAR POLYLACTAM ARTICLE CONTAINING FIBERS
Filed Sept. 28, 1964
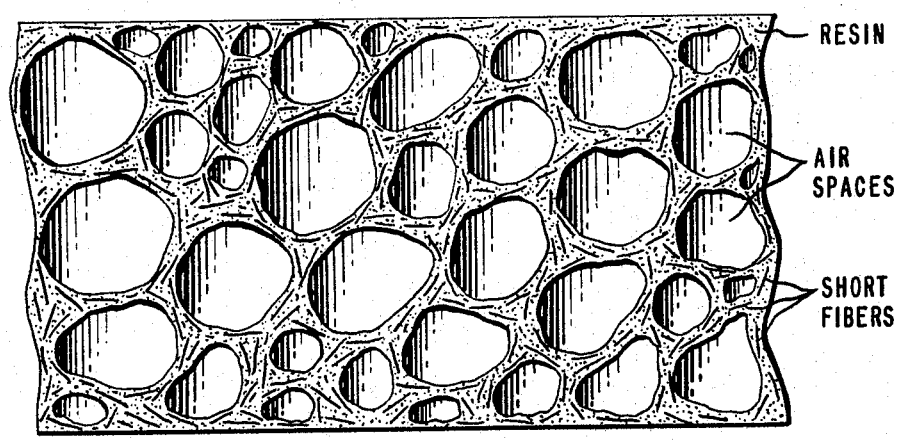
INVENTOR
GEORGE E. MUNN
BY
ATTORNEY

| United States Patent Office | 3,332,895
Patented July 25, 1967 |

3,332,895
CELLULAR POLYLACTAM ARTICLE CONTAINING FIBERS
George E. Munn, Wilmington, Del., assignor to E. I. du Pont de Nemours and Company, Wilmington, Del., a corporation of Delaware
Filed Sept. 28, 1964, Ser. No. 399,456
15 Claims. (Cl. 260—2.5)

This invention relates to the manufacture of cellular or foamed plastic articles. More particularly, it relates to the preparation of cellular articles of polylactams for use in the building and furniture industries.

For many years the building and furniture industries have sought a substitute for wood in many important applications. Wooden window frames, door frames, doors, wooden shutters, wooden cabinet drawers, etc. are used but pose difficulties, particularly in prefabricated construction. The wood has to be protected from moisture changes in the atmosphere. Otherwise, warpage of the wood will occur and, in general, the dimensional instability of the wood with changes in humidity tend to make such items difficult to assemble in place. Furthermore, buckling and expansion may develop after assembly to cause problems in opening and shutting windows, doors, drawers, etc. Also, the attraction of wood to the appetites of insects, rodents, etc. and the rotting and, in general, poor weathering properties of wood pose additional problems. Consequently, metals such as aluminum, steel, etc. have found applications as window frames, door frames, drawers, etc. However, metals and poor insulators and atmospheric condensation tends to reduce the desirability of metals as window frames and as door frames. Furthermore, the styling of metals is restricted. The desirability of an inexpensive plastic is evident. A foamed plastic, being even less expensive than a solid plastic, and being a better insulator, is even more desirable. Among the foamed plastics that are relatively inexpensive to fabricate and yet, as articles, have sufficient strength, stiffness, and toughness are the foamed polyamides made by the casting technique. However, these materials are sensitive to humidity variations and tend to change their dimensions with moisture changes in the atmosphere. Thus, the problems of buckling and warpage remain and have heretofore made foamed plastic articles unattractive.

It is an object of the present invention to provide a foamed plastic material that is useful in the building and furniture industries, a material that displays outstanding physical properties, yet is relatively stable dimensionally to changes in humidity. Other objects will appear hereinafter.

The objects are accomplished by a cellular polylactam article composed of cells separated by solids, the volume percent of solids being 10–80% of the total volume, 5–50 weight percent, preferably 5–30 weight percent of the solids being short fibers of inert material having a modulus of $5 \times 10^6$ p.s.i. to $30 \times 10^6$ p.s.i., said fibers having a cross-sectional dimension D of 0.1–1 mil and a length of from three times D to 125 mils, preferably from five times D to 65 mils, said fibers disposed substantially exclusively in the walls of said cells, the long dimension of said fibers being substantially parallel to the surface of said cells. Specifically, the fibers may be composed of calcium silicate, glass, slag wool, fibrous potassium titanate, etc., which materials have a modulus of about $8 \times 10^6$ p.s.i. to about $10 \times 10^6$ p.s.i., or may also be composed of aluminum having a modulus of $10 \times 10^6$ p.s.i. to $11 \times 10^6$ p.s.i., copper having a modulus of $15 \times 10^6$ p.s.i. to $17 \times 10^6$ p.s.i. and steel which displays a modulus of from $27 \times 10^6$ p.s.i. to about $30 \times 10^6$ p.s.i. A schematic illustration of the cellular article of this invention is presented in the drawing.

In order to prepare the cellular polylactam articles of this invention, it is critical to add the fibers to the polymerization mixture before polymerization and foaming occur. In all other respects, the processing is substantially conventional.

Although the process will be described for the polymerization of caprolactam, it should be understood that it is applicable to the polymerization of the higher lactams, i.e., lactams containing at least six carbon atoms in the lactam ring, to the corresponding polyamides. Hence, besides e-caprolactam, the process is applicable to enantholactam, caprylolactam, decanolactam, undecanolactam, dodecanolactam, pentadecanolactam, hexadecanolactam, methylcyclohexanone isoximes, cyclic hexamethylene adipamide, and the like, and mixtures thereof.

Specifically, one process for forming the polycaprolactam article comprises dispersing a portion of the short fibers in a portion of substantially anhydrous e-caprolactam and then dissolving the cocatalyst in said dispersion at a temperature of about 100–180° C. to form stream (A); dispersing a portion of the short fibers in a solution of a metalcaprolactam in substantially anhydrous e-caprolactam, said metal selected from the group consisting of alkali metals and alkaline earth metals, at a temperature of about 100–150° C., to form stream (B), the total of said short fibers in both streams comprising 5–50 weight percent, preferably 5–30 weight percent, based on the total weight of solids, said short fibers being of an inert material having a modulus of $5 \times 10^6$ p.s.i. to $30 \times 10^6$ p.s.i. and also having a cross-sectional dimension D of 0.1–1 mil and a length of from three times D to 125 mils, preferably from five times D to 65 mils; mixing stream (A) and stream (B) and a blowing agent while maintaining the temperature of the mixture between 140–160° C., immediately thereafter pouring the mixture into a mold having the form of the desired shaped article; maintaining the temperature of the mixture in said mold between 140° C. and 215° C. until solidification of the formed material occurs; and withdrawing the shaped article from the mold. Alternatively, the fibers may be added to either stream (A) or stream (B) and the blowing agent may be added to either of these streams provided that the agent does not react with the materials in the stream or is not driven off prior to mixing of the streams.

The metal caprolactam used in stream (B) is the well-known anionic polymerization catalyst. This catalyst is the reaction product of the lactam with an alkali-metal (lithium, sodium, potassium) base or an alkaline earth metal (magnesium, calcium, strontium) base or with a metal-alkyl base derived from zinc or aluminum. The anionic catalyst, then, is a caprolactam anion formed by the removal of the proton on the nitrogen of the lactam by reaction of the lactam with a metal base having a strength sufficient to remove the proton attached to the lactam nitrogen atom, as for example in the reaction indicated by the equation

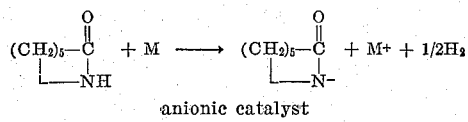

anionic catalyst where M is a metal such as sodium. Analogous reactions occur with the metal bases described hereinbelow, which all form this anionic catalyst. The alkali and alkaline earth metal bases suitable for reaction with e-caprolactam to form the anionic catalyst include the free metals, the metal hydrides, the metal alkoxides, the metal hydroxides, the metal carbonates, the metal alkyls and aryls, including Grignard reagents (RMgX where R is alkyl or aryl and X is chlorine, bromine, or iodine) such as ethyl magnesium chloride, methyl magnesium bromide, phenyl magnesium bromide or the like, and metal amides such as NaNH$_2$, MgNH, Mg(NH$_2$)$_2$, Mg(N(CH$_3$)$_2$)$_2$,

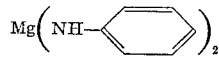

etc. Specific examples of suitable organometallic bases include diethyl zinc, diphenylmagnesium, triisopropyl aluminum, ethyl sodium, ethyl potassium, lithium aluminum hydride, butyl lithium, triphenyl methyl sodium, propyl sodium, phenyl sodium, diisobutyl aluminum hydride and the like. Any of the above are suitable to produce the catalyst wherever hereinafter the term "anionic catalyst" is employed. Likewise omega-lactams other than caprolactam can be used to form the anionic catalyst, e.g., enantholactam, pyrrolidone, piperidone, caprylolactam, dodecanolactam, and in general, omega-lactams having from 5 to 12 atoms in the lactam ring.

The anionic catalyst is prepared by heating the lactam with the base at a temperature between about 25° and 225° C. and above the melting point of the lactam. The base can be added to the total lactam which is to be polymerized or to a portion of the lactam which is to be polymerized and this portion of the lactam containing the anionic catalyst added to more of the lactam later. Essentially no polymerization occurs during the preparation of the anionic catalyst carried out between the melting point of the lactam and about 225° C. However, if the anionic catalyst is to be held for any appreciable time, it is preferably held at a temperature below about 125 C. The time required for this step in the process depends upon the strength of the base employed, the proportion added, and the temperature chosen and can be from a few seconds to several hours. Preferably, the lactam should be essentially anhydrous as should the added base. Generally, the amount of the base charged should be about from 0.1-10 mole percent based on the total lactam used in preparing the anionic catalyst and the subsequent polymerization. Proportions in the higher end of this range produce lower molecular weight polyamides and faster rates, so optimum proportions for most purposes are from about 0.2 to 5 mole percent of the strong base.

The cocatalyst used in solution (A), sometimes termed promoters, are usually derived from organic and inorganic acids of particular types. Some effective cocatalysts include acylating agents and acyl compounds, for example, acyl halides, anhydrides, imides, and the like, organic isocyanates, ketenes, and substituted ureas. Specifically desirable are N-substituted imides having the structural formula

wherein A is an acyl radical such as carbonyl, thiocarbonyl, sulfonyl, phosphinyl, and thiophosphinyl radicals, B is an acyl radical of the group A and nitroso, R is a radical such as A, hydrocarbyl, and heterocyclic radicals and derivatives thereof, wherein said radicals in turn can contain radicals such as carbonyl, thicarbonyl, sulfonyl, nitroso, phosphinyl, thiophosphinyl, tert-amino, acylamide, N-substituted carbamyl, N-substituted carbamido, alkoxy, ether groups and the like, A and B, or A and R, together can form a ring system through a divalent linking group, and any free valence bond of the A and B radicals can be hydrogen or R, excepting A directly linked thereto. The carbonate esters having at least one carbocyclic aromatic ring attached to the carbonate (e.g., the polycarbonate of 4,4'-dihydroxydiphenyl-2,2-propane) which is the subject of U.S. patent application Ser. No. 242,895, filed Dec. 7, 1962, and assigned to the assignee of the present application, is another desirable cocatalyst. Still another desirable cocatalyst is 2,2,4-trimethyl-3-hydroxy-3-pentenoic acid, β-lactone, which is the subject of U.S. patent application Ser. No. 229,161, filed Oct. 8, 1962, and assigned to the assignee of the present application. The acyl-bis heterocyclic compounds (e.g., sebacoyl-bis pyrazole) disclosed in U.S. patent application Ser. No. 266,810, which was filed on Mar. 21, 1963 and assigned to the assignee of the present application, are also desirable cocatalysts. The triazine derivatives (e.g., the caprolactam derivatives of triazines) disclosed in U.S. patent application Ser. No. 135,791, which was filed on Sept. 5, 1961, and was assigned to the assignee of the present application, is another desirable class of cocatalysts. Other promoters which can be used include the reaction products of acylating agents with the lactam, the N-acyl lactams (including a combination of an acid chloride or anhydride with an N,N'-substituted urea such as has been described hereinabove), halogenated alkanones and cycloalkanones, as described in the copending application of M. I. Kohan, Ser. No. 127,908, dilactim ethers having the structure

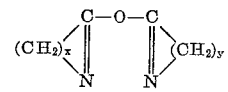

as described in the copending application of M. I. Kohan, Ser. No. 135,792, and benzimido compounds of the structure

where R is a hydrocarbon radical and X is halogen or —OR, as described in the copending application of Anderson and Kohan, Ser. No. 138,302.

The cocatalyst can be employed in proportions varying from about 0.05 to about 5 mole percent based on the total lactam. Preferably, the proportion of the cocatalyst is less than the proportion of the anionic catalyst and usually not more than ½ of the proportion of anionic catalyst. The cocatalyst can be added to the lactam containing the anionic catalyst just prior to casting or, preferably, dissolved in a separate portion of the lactam to form stream (A) and the two portions of lactam mixed at the time the polymerization is desired. For optimum operation of the process of this invention, an inert gas such as nitrogen is bubbled through the molten lactam during the initial reaction with the basic catalyst to remove low molecular weight compounds and to prevent oxidation. Alternatively, the reaction of the lactam with the basic catalyst can be carried out under reduced pressure in which case the low molecular weight compound is distilled from the lactam.

The blowing agent may be chosen from either of two groups of chemicals. The first group comprises thermally stable gases, liquids, and solids which are soluble in and compatible with the constituents of the catalyzed caprolactam composition at the mixing temperature, which do not interfere with the polymerization of caprolactam, and which subsequently are disengaged from the caprolactam composition in gaseous form during the polymerization. Materials in this group of blowing agents include benzene, cyclohexane, trioxane, hexane, heptane, hexene-1, n-octane, propane and the like. These materials which are chemically inert in the reaction system and have suitable solubility and volatility may be used in amounts from 1% to 15% by weight, preferably 2–10%.

Alternatively, a chemical blowing agent may be used. This agent is soluble or is dispersed in finely divided form in the caprolactam mixture, is compatible with it at working temperatures, and does not materially interfere with the polymerization of the caprolactam. The chemical blowing agent may be incorporated in stream (A) of the e-caprolactam composition together with cocatalyst and subsequently the composition after mixing with stream (B) is foamed during polymerization; or the blowing agent may be added as a separate stream during the mixing of streams (A) and (B). Certain azo compounds such as α,α'-azobis(isobutyronitrile) and α,α'-azobis(cyclohexanecarbonitrile) are effective chemical blowing agents.

The preferred blowing agents are disclosed in patent application Ser. No. 171,356, filed Feb. 6, 1962. These agents are substituted allylic azides, including benzyl azides, which have the formula

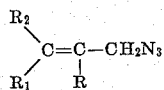

in which at least one azidomethyl group is directly attached to a carbon atom which in turn is attached to another carbon atom by a double bond which may occupy a position in either a linear or a cyclic structure. Thus, in the above formula, R, $R_1$, and $R_2$ may be hydrogen, alkyl groups, aryl groups and substituted alkyl and aryl groups; in the case of the benzyl azides the $>C=C<$ linkage will be included within an aromatic ring structure, in which case R and $R_1$ taken together in the formula above represent the carbon atoms completing the aromatic or benzenoid ring, which may also have additional substituents attached to the carbon atoms of the ring. Specifically useful allylic azides include 1-azido-5,5,7,7-tetramethyloctene-2, dodecenyl azide, o-methylbenzyl azide, m-methylbenzyl azide, p-methylbenzyl azide, benzyl azide, 3,4-dimethylbenzyl azide, 2,4,5-trimethylbenzyl azide, dodecylbenzyl azide, p-phenoxybenzyl azide, $\alpha^1,\alpha^4$-diazidohexamethylbenzene, and $\alpha^1$-azidomethyl-2,3,5,6-tetramethylbenzene. These may be used in amounts from 0.1% to 5% by weight. They may be used along with other blowing agents such as the thermally stable agents.

The use of 5–50 weight percent of short fibers of the material specified and in the manner specified is critical in achieving the results of this invention. Not only do these fibers provide improved modulus (stiffness), but more importantly, they provide significant improvement in dimensional stability of the foamed plastic to temperature and humidity changes. These improvements are achieved with no substantial reduction in the basic toughness of the polymeric material. These improvements are not achieved with non-fibrous or particulate fillers, nor are they achieved if the fibrous fillers are not parallel to the surface of the cells of the foamed article.

To achieve the proper orientation of the fibers in the final cellular article, it is necessary that the fibers be incorporated into the mixture of monomer, catalyst, etc. prior to polymerization and foaming. In order to provide an adequate modulus in the final article, a modulus of $5 \times 10^6$ p.s.i. to $30 \times 10^6$ p.s.i. for the fibers is necessary.

The size of the fibers and the maximum amount used is critical to the success of the process. Large fibers or an amount of fibers greater than 50 weight percent, as specified, cannot be processed in conventional equipment. In fact, the shorter the fibers within the specified range, the greater the percentage that can be used. Thus, where the length of the fibers exceeds 65 mils, the percentage used may be limited to not more than 30 weight percent. It should also be understood that non-fibrous or particulate fillers may be used along with the short fibers. In fact, it may be desirable for the total filler to be composed of from about 10% to as much as 90% of the non-fibrous filler and, preferably, at least 50% of total filler should be non-fibrous filler for processing purposes, i.e, to offset the settling tendency of the fibrous filler. Such non-fibrous fillers include finely-divided fillers of calcium carbonate, alumina, aluminum silicate, calcium silicate, Portland cement, titanium dioxide, etc. However, should the total filler exceed about 60 weight percent, adverse effects on the strength and toughness of the final product may be expected.

The invention will be more clearly understood by referring to the examples which follow. The examples, which illustrate specific embodiments of the present invention, should not be construed to limit the invention.

EXAMPLES 1–3

Stream (A) is prepared by dissolving the cocatalyst consisting of 1.3 grams of the polycarbonate of the 2,2-bis(4-hydroxyphenyl) propane and 3.0 milliliters of 2,2,4-trimethyl-3-hydroxy-3-pentenoic acid $\beta$-lactone in 75 grams of essentially anhydrous e-caprolactam. This stream is heated to about 150° C. under a nitrogen atmosphere.

To prepare stream (B), 500 grams of essentially anhydrous caprolactam containing 2.07 mole percent of sodium caprolactam and 11.5 grams of potassium stearate is heated to about 150° C. under a nitrogen atmosphere. 288 grams of the filler shown in Table I is then dispersed in stream (B). The filler is thoroughly dried before the addition.

The two streams, along with 12.1 milliliters of the blowing agent composed of equal parts by weight of dodecenyl azide and hexane, are mixed and the resulting mixture is poured into an open-top mold (¼″ x 15″ x 15″). The mold is held at 150° C. for about ten minutes and the resulting sheet is removed and tested for modulus, dimensional stability and thermal coefficient of expansion. The density of the resulting cellular article is about 0.73 grams/milliliter and the weight percent filler is 33%. In Examples 1–3, at least 10% fibrous filler is used. In Controls A and B, no fibrous filler is used. In Control C, no filler is used.

The modulus is measured at 23° C. and at 50 percent relative humidity by the method described in the A.S.T.M. Manual as A.S.T.M. Procedure D–790.

The dimensional stability is determined at a relative humidity of 100% by cutting samples from the sheet in the form of ½″ x 3½″ bars. These bars are weighed and their length is measured. They are then exposed to three alternating wet-dry cycles by immersion in boiling water for a period of 20 hours followed by a drying cycle at 120° C. in a continually purged nitrogen atmosphere for a period of 20 hours. Since the first cycle is quite sensitive to extraneous factors, e.g., the extractable content, molded-in stresses, etc., the dimensional stability is given as the average length change (the percent of the original length) for the last two wet-dry cycles.

Thermal coefficient of expansion is determined by the method described in the A.S.T.M. Manual as A.S.T.M. Procedure D–696–44.

TABLE I

| Example | Weight Percent Fibrous Filler | Weight Percent Non-fibrous filler |
|---|---|---|
| 1 | 10 "Cab-O-Lite" F–1 [1] | 23 "Non-Fer-Al" [4] |
| 2 | 10 ⅟₁₆″ long Glass [2] | 23 "Non-Fer-Al" |
| 3 | 33 "HDK-5" [3] | |
| Control A | | {10 Alumina T–60 [5] <br> {23 "Non-Fer-Al" |
| Control B | | 33 Alumina T–60 |
| Control C | | |

| Example | Modulus (psi) | Dimensional Stability (Percent) | Thermal Coefficient of Expansion (in./in./° C.) |
|---|---|---|---|
| 1 | 181,000 | 1.1 | $5.1 \times 10^{-5}$ |
| 2 | 152,000 | 1.1 | $5 \times 10^{-5}$ |
| 3 | 171,000 | 1.0 | $4.7 \times 10^{-5}$ |
| Control A | 117,000 | 2.1 | $8 \times 10^{-5}$ |
| Control B | 106,000 | 2.1 | $9.4 \times 10^{-5}$ |
| Control C | 62,000 | 2.7 | $11 \times 10^{-5}$ |

[1] Wollastonite (calcium silicate) ore ground to yield fibers, longest being about ⅟₁₆″ long, and the lengths averaging 14 times "D" manufactured by Cabot Corp.
[2] Diameter of about 10 microns manufactured by Owens-Corning Fiberglas Co.
[3] Milled glass fibers cut to lengths no greater than 65 mils, length being about 3 times "D", manufactured by Johns-Manville Co.
[4] Precipitated calcium carbonate with average particle size of 7 microns manufactured by Diamond Alkali Co.
[5] Tabular alumina manufactured by Alcoa Corp.

EXAMPLE 4

Stream (A) is prepared by dissolving the cocatalyst consisting of 1.3 grams of the polycarbonate of the 2,2- bis(4-hydroxyphenyl) propane and 3.0 milliliters of 2,2,4-trimethyl-3-hydroxy-3-pentenoic acid β-lactone in 75 grams of essentially anhydrous e-caprolactam. This stream is heated to about 150° C. under a nitrogen atmosphere.

To prepare stream (B), 500 grams of essentially anhydrous caprolactam containing 2.07 mole percent of sodium caprolactam ad 11.5 grams of potassium stearate is heated to about 150° C. under a nitrogen atmosphere. 383 grams of the filler shown in Table II is then dispersed in stream (B). The filler is thoroughly dried before the addition.

The two streams, along with 12.1 milliliters of the blowing agent composed of equal parts of dodecenyl azide and hexane, are mixed and the resulting mixture is poured into an open-top mold (¼" x 15" x 15"). The mold is held at 150° C. for about ten minutes and the resulting sheet is removed and tested for modulus and dimensional stability. The density of the resulting cellular article is about 0.70 grams/milliliter and the weight percent filler is 40%. In Example 4, 10% fibrous filler is used. In Control A, no fibrous filler is used.

TABLE II

| Example | Weight Percent Fibrous Filler | Weight Percent Non-fibrous filler | Modulus (p.s.i.) | Dimensional Stability (Percent) |
|---|---|---|---|---|
| 4 | 10 "Cab-O-Lite" F-1 | 30 "Glomax" WZ* | 150,000 | 1.1 |
| Control A | | 40 "Glomax" WZ | 99,000 | 1.9 |

*A calcined clay having average particle size of 7 microns manufactured by Georgia Kaolin Co.

EXAMPLES 5–6

Stream (A) is prepared by dissolving the cocatalyst consisting of 1.3 grams of the polycarbonate of the 2,2-bis(4-hydroxyphenyl) propane and 3.0 milliliters of 2,2,4-trimethyl-3-hydroxy-3-pentenoic acid β-lactone in 75 grams of essentially anhydrous e-caprolactam. This stream is heated to about 150° C. under a nitrogen atmosphere.

To prepare stream (B), 500 grams of essentially anhydrous caprolactam containing 2.07 mole percent of sodium caprolactam and 11.5 grams of potassium stearate is heated to about 150° C. under a nitrogen atmosphere. 383 grams of the filler shown in Table III is then dispersed in stream (B). The filler is thoroughly dried before the addition.

The two streams, along with 7.6 milliliters of the blowing agent composed of equal parts of dodecenyl azide and hexane, are mixed and the resulting mixture is poured into an open-top mold (¼" x 15" x 15"). The mold is held at 150° C. for about ten minutes and the resulting sheet is removed and tested for modulus and dimensional stability. The density of the resulting cellular article is about 0.90 grams/milliliter and the weight percent filler is 40%. In examples 5 and 6, at least 10% fibrous filler is used. In Control A, no fibrous filler is used.

TABLE III

| Example | Weight Percent Fibrous Filler | Weight Percent Non-fibrous filler | Modulus (p.s.i.) | Dimensional Stability (Percent) |
|---|---|---|---|---|
| 5 | 10 "Cab-O-Lite" F-1 | 30 "Glomax" WZ | 220,000 | 1.1 |
| 6 | 16 "Cab-O-Lite" F-1 | 24 "Glomax" WZ | 225,000 | 0.8 |
| Control A | | 40 "Glomax" WZ | 159,000 | 1.8 |

What is claimed is:

1. A cellular polylactam article comprising cells separated by solids, the volume percent of said solids being 10–80%, 5–50 weight percent of said solids being short fibers of inert material having a modulus of $5 \times 10^6$ p.s.i. to $30 \times 10^6$ p.s.i., said fibers having a cross-sectional dimension D of 0.1–1 mil and a length of from three times D to 125 mils, said fibers disposed substantially exclusively in the walls of said cells, the long dimension of said fibers being substantially parallel to the surface of said cells.

2. An article as in claim 1 wherein said fibers are selected from the group consisting of calcium silicate fibers, glass fibers, slag wool fibers and fibrous potassium titanate.

3. An article as in claim 1 containing up to 45% by weight of a non-fibrous filler, the total amount of said short fibers and said non-fibrous filler being no greater than 60% by weight of said solids.

4. An article as in claim 3 wherein said non-fibrous filler is selected from the group consisting of calcium carbonate, alumina, aluminum silicate, calcium silicate, Portland cement and titanium dioxide.

5. An article as in claim 3 wherein said short fibers are calcium silicate fibers and said non-fibrous filler is calcium carbonate.

6. A cellular polylactam article comprising cells separated by solids, the volume percent of said solids being 10–80%, 5–30 weight percent of said solids being short fibers of inert material having a modulus of $5 \times 10^6$ p.s.i. to $30 \times 10^6$ p.s.i., said fibers having a cross-sectional dimension D of 0.1–1 mil and a length of from three times D to 125 mils, said fibers disposed substantially exclusively in the walls of said cells, the long dimension of said fibers being substantially parallel to the surface of said cells.

7. A cellular polylactam article comprising cells separated by solids, the volume percent of said solids being 10–80%, 5–50 weight percent of said solids being short fibers of inert material having a modulus of $5 \times 10^6$ p.s.i. to $30 \times 10^6$ p.s.i., said fibers having a cross-sectional dimension D of 0.1–1 mil and a length of from five times D to 65 mils, said fibers disposed substantially exclusively in the walls of said cells, the long dimension of said fibers being substantially parallel to the surface of said cells.

8. A cellular polylactam article comprising cells separated by solids, the volume percent of said solids being 10–80%, 5–30 weight percent of said solids being short fibers of inert material having a modulus of $5 \times 10^6$ p.s.i. to $30 \times 10^6$ p.s.i., said fibers having a cross-sectional dimension D of 0.1–1 mil and a length of from five times D to 65 mils, said fibers disposed substantially exclusively in the walls of said cells, the long dimension of said fibers being substantially parallel to the surface of said cells.

9. In a process for preparing a cellular polylactam article which comprises forming a molten solution by mixing e-caprolactam, an anionic polymerization catalyst therefor, a co-catalyst and a foaming agent while maintaining the temperature of the mixture between 140° and 160° C., immediately thereafter pouring the mixture into a mold having the form of the desired shaped article, maintaining the temperature of the mixture in the mold between 140° and 215° C. until solidification of the foamed material occurs and withdrawing the shaped article from the mold, the improvement wherein 5–50 weight percent based on the total weight of solids of short fibers of an inert material having a modulus of $5 \times 10^6$ p.s.i. to $30 \times 10^6$ p.s.i. are added to the mixture prior to polymerization and foaming, said fibers having a cross-sectional dimension D of 0.1–1 mil and a length of from three times D to 125 mils.

10. The improvement as in claim 9 wherein said short fibers are selected from the group consisting of calcium silicate fibers, glass fibers, slag wool fibers and fibrous potassium titanate.

11. The improvement as in claim 9 wherein up to 45% by weight of a non-fibrous filler, the total amount of short fibers and non-fibrous filler being not greater than 60% by weight, is also added prior to foaming.

12. The improvement as in claim 11 wherein said non-fibrous filler is selected from the group consisting of calcium carbonate, alumina, aluminum silicate, calcium silicate, Portland cement and titanium dioxide.

13. The improvement as in claim 11 wherein said non-fibrous filler comprises at least 50% of the total filler.

14. The improvement as in claim 9 wherein said short fibers comprise 5–30 weight percent of the total weight of solids.

15. The improvement as in claim 9 wherein the length of said short fibers is from five times D to 65 mils.

References Cited

UNITED STATES PATENTS

| | | | |
|---|---|---|---|
| 3,017,391 | 1/1962 | Mottus et al. | 260—2.5 |
| 3,166,533 | 1/1965 | Wichterle et al. | 260—2.5 |
| 3,206,418 | 9/1965 | Giberson | 260—2.5 |
| 3,207,713 | 9/1965 | Hyde | 260—2.5 |
| 3,207,729 | 9/1965 | Giberson | 260—2.5 |
| 3,214,415 | 10/1965 | Giberson | 260—2.5 |
| 3,216,977 | 11/1965 | Brouns | 260—2.5 |

MURRAY TILLMAN, *Primary Examiner.*

M. FOELAK, *Assistant Examiner.*